J. CLARK.
CLAMP FOR PIPE JOINTS OF THE BELL AND SPIGOT TYPE.
APPLICATION FILED MAY 20, 1912.
1,051,087.
Patented Jan. 21, 1913.
2 SHEETS—SHEET 1.
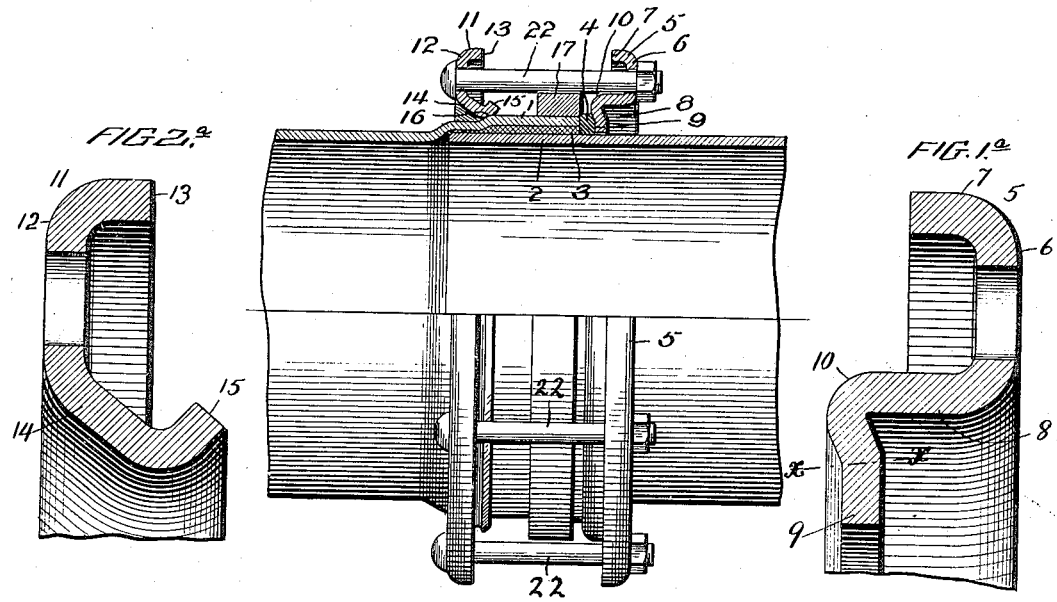
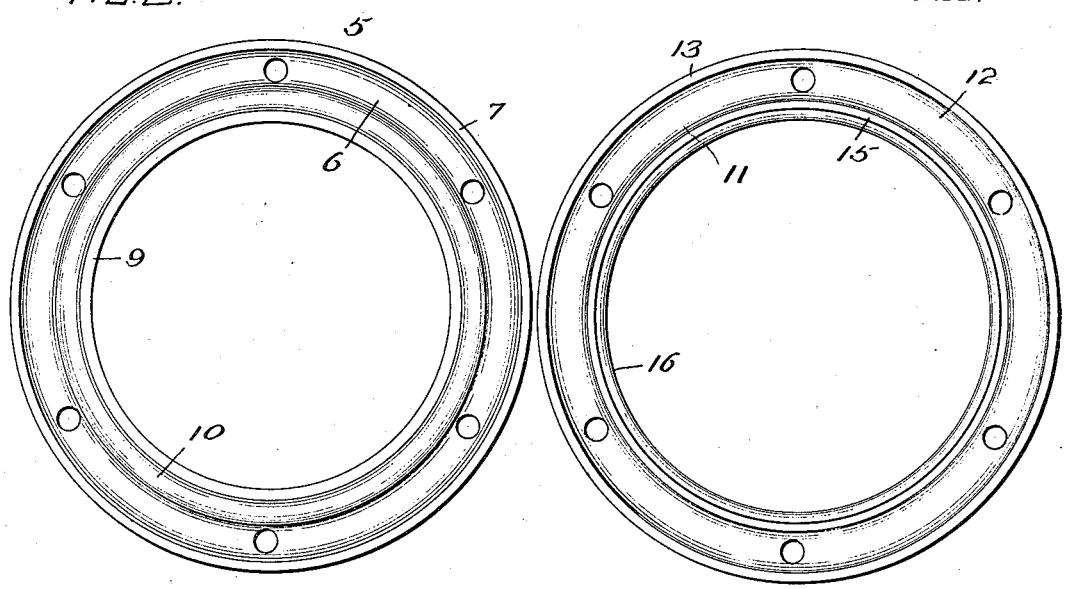

J. CLARK.
CLAMP FOR PIPE JOINTS OF THE BELL AND SPIGOT TYPE.
APPLICATION FILED MAY 20, 1912.
1,051,087.
Patented Jan. 21, 1913.
2 SHEETS—SHEET 2.
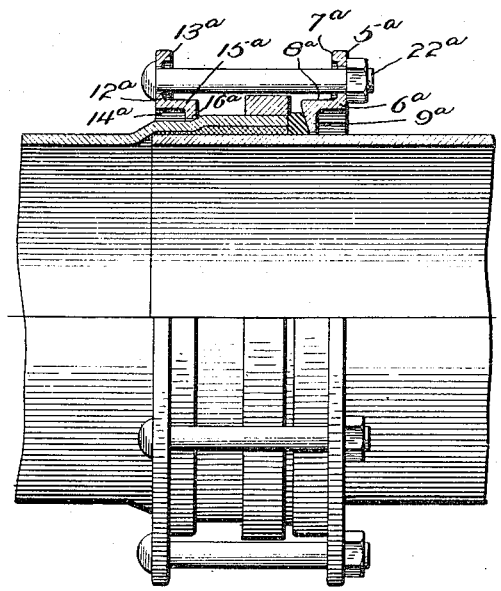
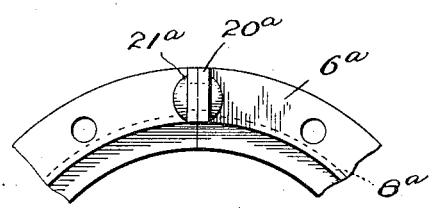
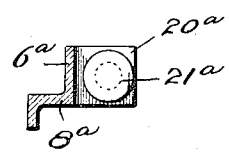
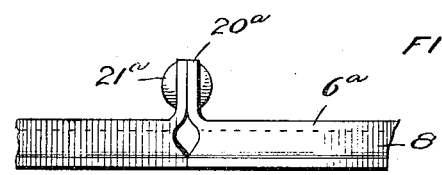
WITNESSES:
INVENTOR
James Clark
BY
Attorneys

# UNITED STATES PATENT OFFICE.

JAMES CLARK, OF BRADFORD, PENNSYLVANIA, ASSIGNOR TO S. R. DRESSER MANUFACTURING COMPANY, OF BRADFORD, PENNSYLVANIA, A CORPORATION OF PENNSYLVANIA.

CLAMP FOR PIPE-JOINTS OF THE BELL-AND-SPIGOT TYPE.

1,051,087.  Specification of Letters Patent.  Patented Jan. 21, 1913.

Application filed May 20, 1912. Serial No. 698,562.

*To all whom it may concern:*

Be it known that I, JAMES CLARK, a citizen of the United States, residing at Bradford, in the county of McKean and State of Pennsylvania, have invented certain new and useful Improvements in Clamps for Pipe-Joints of the Bell-and-Spigot Type; and I do hereby declare the following to be a full, clear, and exact description of the invention, such as will enable others skilled in the art to which it appertains to make and use the same.

My invention is an improvement in wrought metal clamps for use in connection with pipe joints of the bell and spigot type, and it consists in the novel features hereinafter described, reference being had to the accompanying drawings which illustrate two embodiments of the invention selected by me for the purpose of illustrating the invention and said invention is fully disclosed in the following description and claims.

In said drawings, Figure 1 represents a view of a lead packed joint of the type known in the art as a "Mattheson" joint, having applied thereto my preferred form of clamp, the joint with its applied clamp being shown partly in section and partly in elevation. Fig. 1ª is an enlarged partial sectional view of the clamping ring. Fig. 2 is a detail elevation of the clamping ring. Fig. 2ª is an enlarged partial section of the follower. Fig. 3 is a similar elevation of the follower or "bull ring." Fig. 4 is a view similar to Fig. 1 showing a "Mattheson" joint having applied thereto a repair clamp embodying a slight modification of my invention. Figs. 5, 6 and 7 are detail views of a clamping ring similar to that shown in Fig. 4 but made in sections and riveted together.

The object of my invention is to provide a light, strong and highly efficient clamp for a leaded or cemented joints of the bell and spigot type such for example as the "Mattheson" joint, for the purpose of securing in position and compressing a gasket (preferably of rubber) over the outer end of the bell end of the pipe section, to completely seal the space between the bell, and the inclosed spigot end of the adjacent and connected pipe section, and thereby prevent leakage, in case the lead or other non-elastic packing inserted in said space, should not make a perfectly tight joint.

My improved clamp comprises a clamping ring to engage and compress the gasket, a follower or "bull ring" to engage the exterior of the bell, and connecting bolts and nuts for drawing the clamping ring and follower toward each other to effect the compression of the gasket.

While I have herein shown my invention as applied to the well known "Mattheson" joint, it is to be understood that it is adapted for use with any other form of bell and spigot joint.

Referring to the preferred form or embodiment of my invention illustrated in Figs. 1, 2 and 3, 1 represents the bell end of a "Mattheson" pipe section, the outer end of which is provided with the usual reinforcing ring 17; 2 represents the spigot end of the adjacent pipe section, which is inserted in the bell; 3 represents the lead or other non-elastic packing inserted between the bell and spigot as shown and 4 represents an annular compressible or elastic gasket, preferably formed of rubber, and substantially rectangular in cross section. 5 represents the improved clamping ring of my clamp, formed of wrought metal such as steel, and preferably by pressing a blank of sheet steel into the desired form by means of suitable dies. The ring 5 may be made integral, as here shown, or it may be made in two or more segmental sections secured together by bolts or rivets. The blanks for these rings may be cut from sheet metal or formed by bending a flat plate in the plane of its width, and welding the ends together in case the ring is to be made integral. The clamping ring 5 comprises an annular plate member 6, provided with a plurality of bolt holes, and preferably having its outer marginal portion bent angularly to form an annular stiffening flange 7, and its inner marginal portion bent substantially perpendicularly to form an annular wall 8 of greater internal diameter than the spigot end of the pipe sections with which the ring is to be used, said wall terminating in an inwardly extending gasket engaging flange 9 to which it is connected by a sharply curved annular shoulder 10, which forms an annular projection for engaging the outer portion of the gasket and serves to partially confine the gasket, and also to compress it toward the spigot 2, as will be apparent from an examination of Fig. 1. The plate member lying between the exterior stiffening flange and the interior wall 8, is greatly strengthened and stiffened thereby, thus enabling the ring to be made of lighter material than could otherwise be used, and the annular curved portion 10 also serves to further stiffen the ring structure and particularly the gasket engaging flange 9, which is preferably formed by making a bend of the inner marginal portion of the ring outwardly or in a direction away from the plane of the plate member, at the point indicated by x—x in Fig. 1ª where it joins the annular projecting portion 10. The inner edge of the flange 9 forms a circular pipe aperture to embrace the spigot end of a pipe section, and the gasket is engaged by the face of said flange farthest removed from the plane of the plate member. The follower or "bull ring" which I prefer to employ, is shown at 11 and is also formed of steel and preferably by pressing an annular blank of sheet steel into the required form. The follower comprises an annular plate member 12, provided with bolt holes, corresponding to those of the clamping ring, the said plate member being stiffened by bending the outer marginal portions angularly to form the reinforcing flange 13, and the inner marginal portions are bent angularly to form a conical wall or flange 14 inclined to the axis of the ring, and terminating at its inner end in an outwardly bent or flared portion 15 forming the rounded annular shoulder 16 which is of such diameter as to engage and fit against the shoulder or one of the shoulders on the exterior of the bell end 1 of a pipe section, in this instance the exterior shoulder of greatest diameter.

In assembling the parts of the clamp in connection with a joint of the bell and spigot type, the follower or bull ring is placed around the bell end of one section until it engages the exterior shouldered portion of the bell, the gasket 4 is placed in position around the spigot end of the adjacent section, with its inner face in engagement with the bell end and the non-elastic packing 3. The clamping ring is placed around the said spigot end of the adjacent section and moved into engagement with the packing and the bolts 22 are then passed through the bolt holes of the follower and clamping ring and the nuts are turned up thus compressing the packing ring against the spigot, the non-elastic packing, and the end of the bell, and producing a perfectly tight joint. When these clamps are applied to the joints at the time of laying the pipe and sealing the joints thereof by means of lead or cement, etc., as is frequently the case, I prefer to employ clamping rings and followers made in one piece, but when the clamps are to be used for joints that have been previously laid and sealed, it is obviously convenient to employ clamping rings and followers made in two or more segmental parts united by bolts and nuts to facilitate placing these parts around the pipe sections. The gaskets in such case will also be severed, placed around the pipe and have their meeting ends provided with wedge shaped overlapping portions, in a well known way.

The peculiar construction of the clamping ring and follower, as shown, provides great strength with a minimum of weight, for example in the follower, the pressure of the bolts is transmitted by the inclined or conical wall 14 to the shoulder 16 of the bell, in the general direction of said wall 14, and in a very direct manner, and it is practically impossible for said wall 14 to yield either inwardly or outwardly. In the case of the clamping ring the pressure of the bolts is transmitted by the annular wall 8 to the gasket engaging portions of the ring and to the gasket, in the direct line of said wall, and in both the clamping ring and the follower the plate member is greatly stiffened by the exterior flange, and interior wall, while the wall is further stiffened by the bend or shoulder formed at its inner edge.

In Fig. 4 I have shown a slightly modified form of clamp applied to a "Mattheson" joint in all respects similar to that shown in Fig. 1, the parts in this figure being given the same reference numerals as the corresponding parts in Fig. 1 with the addition of the letter "a", as 1ª, etc. The follower 11ª and clamping ring 5ª shown in this figure may each be conveniently made by rolling a bar of wrought iron or steel of the required cross section, bending a portion of the bar of the required length to make the ring into circular form and uniting the ends by welding, riveting or otherwise. The clamping ring 5ª has an annular plate member 6ª, an annular wall 8ª extending substantially perpendicularly from its inner edge, and a reinforcing wall 7ª at its outer edge. The wall 8ª terminates in an inwardly extending flange 9ª, the gasket engaging face of which is on the side farther from the plate member, and portions remote from the pipe aperture, located a greater distance from the plane of the plate member, than the portions adjacent to the pipe aperture, thus forming an annular shoulder where the flange 9ª joins the wall 8ª, and facilitating the retention of the gasket and its compression toward the pipe aperture, the metal being of greater thickness at the shoulder to stiffen the ring and reinforce the flange member. The follower shown in Fig. 4 is constructed in substantially the same manner as the clamping ring, having the plate member 12ª, the exterior flange 13ª, the interior wall 14ª terminating in the inwardly extending flange 15ª, the inner edge of 16ª of which forms a pipe aperture of greater diameter than that of the coöperating clamping ring, to fit around the exterior of a bell end of a pipe section, engage a shoulder thereon as shown, and form an abutment against which the bolts 22ª can draw.

In Figs. 5, 6 and 7 I have shown a ring substantially of the section shown in Fig. 4, formed in segments provided with perforated ears 20ª united by bolts or rivets 21ª, rivets being herein shown, although obviously a bolt and nut could be used in the place of the rivets or any of them if desired, and it is to be understood that the rings shown in Figs. 1, 2 and 3 may in like manner be made in segments and provided with perforated ears by which said segments may be united by means of bolts or rivets, as before stated.

What I claim and desire to secure by Letters Patent is:—

1. A clamp for pipe couplings of the bell and spigot type, comprising among its members, a clamping ring formed of wrought metal and having an annular plate member, an annular wall disposed angularly to the plate member and extending from the inner edge of the plate member, and an annular flange member extending inwardly from the outer end of said wall and having a packing engaging face on the side farther from the plate member, the inner edge of said flange forming a circular pipe aperture, for engaging the spigot end of a pipe section, and a follower formed of wrought metal and having an annular plate member, an annular wall disposed angularly thereto and extending from the inner edge of the plate member, and an annular flange portion, forming a pipe aperture of larger diameter than the pipe aperture of the clamping ring, for engaging the bell end of a pipe section, a gasket and clamping bolts and nuts for connecting the clamping ring and follower.

2. A clamp for pipe couplings of the bell and spigot type comprising among its members, a clamping ring, a follower formed of wrought metal and having an annular plate member, an annular wall disposed angularly thereto and connected to the plate member adjacent to its inner edge and an outwardly extending flange member connected to the other end of said annular wall, and forming a circular pipe aperture adjacent to the junction of said flange member and wall, for engaging the exterior of a bell end of a pipe section, a gasket for said clamping ring and bolts for connecting said clamping ring and follower.

3. A follower for pipe couplings of the bell and spigot type formed of pressed wrought sheet metal, and comprising an annular plate member, an annular conical wall extending from the inner edge of the plate member, and having its greatest diameter adjacent to the plate member, said wall having at its opposite end an annular outwardly bent flange and providing an annular rounded portion adjacent to the junction of said wall and flange, for engaging the exterior of the bell end of a pipe section.

4. In a clamp for pipe couplings of the bell and spigot type, a ring formed of wrought metal and comprising an annular plate member having bolt holes therein, an annular wall extending from the inner edge of the plate member, substantially perpendicular thereto, and terminating in a rounded annular portion, the inner portions of which diverge from a plane perpendicular to the axis of the ring, and extend in a direction toward the plane of the plate member and an annular flange, extending inwardly from the said diverging portions of said rounded portion, the inner edge of said flange forming a pipe aperture, said flange having a gasket engaging face on the side farther from the plate member.

5. In a clamp for pipe couplings of the bell and spigot type; a ring formed of wrought metal, and comprising an annular plate member having bolt holes therein, an annular wall extending from the inner edge of said plate member, substantially perpendicular thereto, and terminating in a rounded annular portion, the inner portions of which diverge from a plane perpendicular to the axis of the ring and extend in a direction toward the plane of the plate member, and an annular flange, disposed substantially perpendicularly to the axis of the ring, extending inwardly from and at an angle to the said diverging portion of the annular rounded portion, the inner edge of said flange forming a pipe aperture, whereby the closely adjacent reverse bends will stiffen the ring at the junction of said flange with said annular wall, and said rounded portion will project beyond said flange in a direction away from the plane of the plate member.

In testimony whereof I affix my signature, in the presence of two witnesses.

JAMES CLARK.

Witnesses:
H. M. WICK,
GUY W. IRWIN.